(12) United States Patent
Papadimitriou et al.

(10) Patent No.: US 7,164,926 B2
(45) Date of Patent: Jan. 16, 2007

(54) GLOBAL PAGING OF MOBILE STATIONS IN A WIRELESS NETWORK USING MSC POOL

(75) Inventors: Dimitrious Papadimitriou, Dallas, TX (US); Jo Kuster, Prosper, TX (US); Klaus Turina, Backnang (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 399 days.

(21) Appl. No.: 09/879,452

(22) Filed: Jun. 12, 2001

(65) Prior Publication Data

US 2002/0187793 A1 Dec. 12, 2002

(51) Int. Cl.
*H04Q 7/20* (2006.01)

(52) U.S. Cl. .................. 455/458; 455/422; 455/435.1; 455/432.1; 455/439; 455/435.2

(58) Field of Classification Search ............. 455/426.1, 455/436, 450, 458, 414.1, 422.1, 422, 435, 455/432, 33.1, 33.2, 433, 432.1, 452.1, 515, 455/435.1, 439, 435.2

See application file for complete search history.

(56) References Cited

U.S. PATENT DOCUMENTS

| | | | | |
|---|---|---|---|---|
| 5,153,902 A | * | 10/1992 | Buhl et al. ............... | 455/432.1 |
| 5,289,527 A | * | 2/1994 | Tiedemann, Jr. ......... | 455/435.1 |
| 5,361,396 A | * | 11/1994 | Onoe et al. .............. | 455/435.1 |
| 5,369,681 A | * | 11/1994 | Boudreau et al. ........ | 455/456.1 |
| 5,983,109 A | | 11/1999 | Montoya | |
| 6,035,203 A | * | 3/2000 | Hanson ...................... | 455/458 |

(Continued)

FOREIGN PATENT DOCUMENTS

| | | |
|---|---|---|
| WO | WO 98 59516 A | 12/1998 |
| WO | WO 99 59369 A | 11/1999 |
| WO | WO 02 37866 A | 5/2002 |

OTHER PUBLICATIONS

Hu L-R et al: "Adaptive location management scheme for global personal communications" IEE Proceedings: Communications, Institution of Electrical Engineers, GB, vol. 144, No. 1, Feb. 27, 1997, pp. 54-60, XP006008437 ISSN: 1350-2425 p. 54, right-hand column, line 27-line 30, p. 56, left-hand column, line 1, p. 58, left-hand column, line 1.

*Primary Examiner*—Charles Appiah
*Assistant Examiner*—Randy Peaches

(57) ABSTRACT

A system and methods of global paging of mobile stations in a wireless network. The system includes a MSC pool (50) for servicing mobile stations within a specified service area of the network and a radio configuration database (70) defining a plurality of global paging areas (80, 82, 84) within the specified service area. The radio configuration database (70) is accessible by any mobile switching center (52, 54, 56) in the pool (50) to allow paging of a mobile station (28) roaming within the specified service area according to one or more global paging areas (80, 82, 84). The radio configuration database (70) can be structured in a hierarchy including cells, locations areas, and base station controller/radio network controller (20) for each global paging area in the specified service area. In this way, any mobile switching center in the pool is capable of paging a mobile station within the specified service area by accessing the radio configuration database and determining the cell identity, location area identity, and base station controller/radio network controller identity of a mobile station roaming within the specified service area.

10 Claims, 3 Drawing Sheets

U.S. PATENT DOCUMENTS 6,058,308 A * 5/2000 Kallin et al. .............. 455/432.3
6,097,951 A    8/2000 Reece et al.
6,148,201 A * 11/2000 Ernam et al. ................ 455/433
6,175,735 B1 * 1/2001 Meyer ........................ 455/440
6,343,216 B1 * 1/2002 Kim et al. ................... 455/450
6,546,255 B1 * 4/2003 Cerwall et al. ............. 455/449
6,763,004 B1 * 7/2004 De Oliveira ................ 370/312

* cited by examiner

GLOBAL PAGING OF MOBILE STATIONS IN A WIRELESS NETWORK USING MSC POOL

TECHNICAL FIELD

The invention relates in general to telecommunications networks and more particularly the paging of user devices in a telecommunications network such as a wireless network. More particularly, the invention relates to paging of mobile stations within an area serviced by a pool of mobile switching centers.

BACKGROUND OF THE INVENTION

The increasing demand for wireless telecommunication services has resulted in the growth of many wireless telecommunication systems and increase in the number of roaming wireless subscribers. With newer third generation (3G) systems, efforts have been implemented to accommodate and distribute the increased traffic load in the network among a number of mobile switching centers interconnected such that they constitute a mobile switching center pool (MSC pool). Such 3G networks offer advantages to both subscriber and network/service provider in the form of more efficient utilization of available network resources. Among the advantages realized by the use of the MSC pool include load sharing of network components and increased capacity and/or coverage in areas where the addition of an individual switching element would be cost prohibitive.

There are, however, known limitations and disadvantages of an MSC pool. One such limitation relates to the paging of a mobile station within the network. With second generation (2G) networks, a failure to receive a response from the mobile resulted in an increase of the paging area to a location area associated with the serving MSC. For 3G systems, however, location areas are not well defined meaning that the paging area can extend beyond the territory of a location area and to the entire area served by the MSC pool. This results from the difficulty of determining which MSC in the pool is serving a subscriber, or what MSC in the pool is serving a particular subscriber at any particular point. At the same time, it becomes impossible or highly impractical to globally page a mobile station within the entire service area served by the MSC pool.

Accordingly, a need exists for an improved method and means of paging a mobile station within a MSC pool service area.

SUMMARY OF THE INVENTION

The present invention provides a mechanism that allows the network operator to focus in on where the subscriber will most potentially be located by defining a global paging area where the subscriber was last known to be located and/or by using geographical coordinates and establishing the most plausible geographical area where the subscriber could be. The invention introduces and defines the structure of a radio configuration database and global paging areas that divide the entire network service area into more defined and manageable areas.

Accordingly, disclosed in one embodiment is a system for use in a wireless network provides global paging of mobile stations. The system comprises a pool of mobile switching centers for servicing mobile stations within a specified service area of the wireless network and a radio configuration database defining a plurality of global paging areas within the specified service area. The radio configuration database is accessible by any mobile switching center in the pool to allow paging of a mobile station roaming within the specified service area according to one or more global paging areas. The radio configuration database can be structured in a hierarchy including cells, locations areas, and base station controllers or radio network controllers for each global paging area in the specified service area. In this way, any mobile switching center in the pool is capable of paging a mobile station within the specified service area by accessing the radio configuration database and determining the cell identity, location area identity, and base station controller/radio network controller identity associated with a mobile station roaming within the specified service area.

Also disclosed is a method of paging a mobile station within a wireless network comprising a pool of mobile switching centers. The method comprises the steps of transmitting a paging request for a mobile station to the wireless network. Next, the mobile switching center, to which the mobile station is registered pages the mobile station. Next, if a response to the paging request is not received from the mobile station, the mobile station is globally paged. The step of globally paging the mobile station includes the step of accessing a radio configuration database to obtain the most recent location information for the mobile station.

In one embodiment, the method further comprises the steps of determining which location area the mobile switching center belongs to and determining the global paging area to which the location area belongs. This allows the mobile station to be paged within the global paging area. Thus, the paging step can be performed by paging the mobile station in all location areas within the global paging area.

Further disclosed is an alternate method of globally paging a mobile station within the service area of a wireless network. The method comprises the step of populating a radio configuration database with center and radius coordinates of location areas of the wireless network service area and paging a mobile station within one or more location areas of the wireless network service area using coordinates from the database. The method also includes the step of increasing the radius coordinate to define a larger geographic areas if paging is unsuccessful. The geographic areas can correspond to predefined location areas of the wireless network service area.

The paging step can be performed by paging in a location area defined by a center and radius coordinate contained in the database. Next, the radius coordinate can be increased to define a circular paging area if paging within a given location area is unsuccessful. This defines a new global paging area that includes all neighboring locations area crossed by the circular paging area. Next, paging of the mobile is performed within the circular paging area.

In one embodiment, the step of increasing the radius coordinate is performed such that the circular paging area is dynamically modified. This can be done by storing "n" number of location areas corresponding to a number of location areas where the mobile station was roaming and storing corresponding time stamps indicating when the mobile station entered each of "n" location areas. Next, a determination is made from the time stamps if the mobile station is roaming fast or slow and the radius of the circular paging area is increased in proportion to the roaming speed of the mobile station.

An advantage of the present invention is that it eliminates paging within the whole area serviced by a MSC pool of a 3G network.

Another advantage of the invention is that paging of a mobile is performed efficiently by paging first in area where the mobile is most likely to be located and then, if unsuccessful, in the next most likely area, and so on.

Further advantages will become apparent to those skilled in the arts upon review of the following description, figures and claims.

BRIEF DESCRIPTION OF THE DRAWINGS

The above advantages, as well as specific embodiments of the present invention, will be more clearly understood from consideration of the following descriptions in connection with accompanying drawings in which.

Corresponding numerals and symbols in the various figures refer to corresponding parts unless otherwise indicated.

DETAILED DESCRIPTION OF PREFERRED EMBODIMENTS

Figure 1:
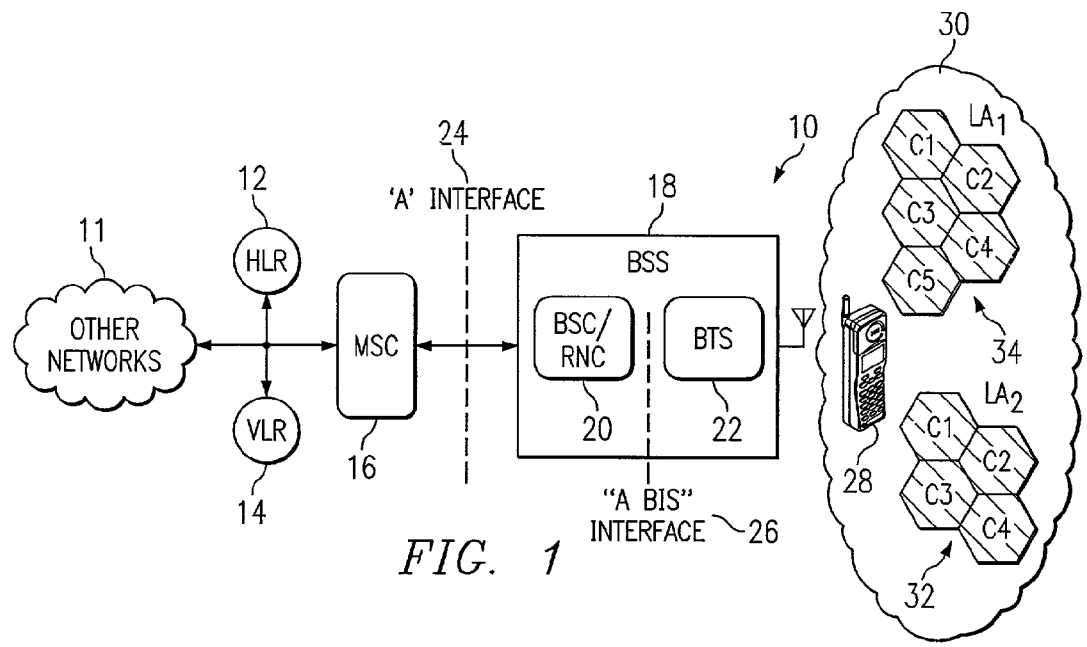
FIG. 1 is a block and system diagram illustrating the primary components of a wireless network.

We first turn to a discussion of the primary components, features and functions of a modern day wireless network. With reference to FIG. 1, therein is shown a diagram of a wireless communications network 10 in which the invention can be practiced. For clarity, the diagram omits some of the essential elements of a commercial network, such as the billing system, the operations and maintenance center, and the network management system, or Network Subsystem (NSS). On the left of the diagram are interfaces for signaling and message traffic to other networks 11, which may be other Global System for Mobile Communications (GSM) systems, the Public-Switched Telephone Network (PSTN), data networks, or other mobile networks. On the right side of the diagram is the air-interface between the Base Transceiver Station (BTS) 22 and Mobile Stations, such as MS 28, used by individual subscribers.

The MS 28 can be a wireless communications device such as a Personal Communications Service (PCS) or cellular phone, but may also include a computer, a Personal Digital Assistant (PDA), or other wireless terminal, for example. The Base Station Subsystem (BSS) 18, which controls the radio link with the MS 28, typically comprises two parts: the BTS 22 (commonly called a base station, or Radio Base Station (RBS)), and the Base Station Controller (BSC) or Radio Network Controller (RNC) 20 (referred to as "BSC/RNC" throughout). The BTS 22 communicates across a standard "A bis" interface 26 with the BSC/RNC 20, allowing operation between components made by different suppliers. The BTS 22 houses radio transceivers that define a cell within a geographical service area and handles the radio-link protocols (e.g., Digital Speech Interpolation (DSI)) that facilitate communication with the MS 28. On the other hand, the BSC 20 manages the radio resources for one or more BTSs 22. The BSC/RNC 20 also handles radio-channel setup, frequency hopping, and handovers. As such, the BSC/RNC 20 is the connection between the MS 28 and the Mobile service Switching Center (MSC) 16.

The BSS 18 and the MSC 16 interface across an 'A' Interface 24 which enable MSCs, such as MSC 16, and BSSs, such as BSS 18, from different manufacturers to work together. The MSC 16, as the central component of the network subsystem, provides all the functionality needed to handle mobile subscriber communications, such as registration, authentication, location updating, handovers, and call routing to roaming subscribers. These functions are provided in conjunction with several other network 10 entities which together form the network subsystem.

As shown, the MSC 16 provides the connection mechanism to the fixed networks 11, which may include the PSTN or an integrated service digital network (ISDN), for example. The Home Location Register (HLR) 12 and Visitor Location Register (VLR) 14, together with the MSC 16, provide call routing and roaming capabilities for the network 10. In particular, the HLR 12 stores administrative information of the subscriber registered in the corresponding network 10, along with the current location of the MS 28. In a GSM network system, for example, the HLR 12 can be interrogated by other GSM operators if a subscriber roams onto their network, allowing them to check authorization and validity of the subscription. The VLR 14 provides a complementary function which allows details of a roaming subscriber to be stored temporarily on a network 10 to which a subscriber is roaming, and details of calls made on the visited network to be recorded. As such, details of these calls are sent back to the roaming subscriber's home network 10 at intervals agreed on by the two operators.

In the wireless telecommunications industry, Time Division Multiple Access (IS-136 TDMA) and Code Division Multiple Access (CDMA) are two major competing systems which split the Radio Frequency (RF). In general, IS-136 TDMA works by dividing each cellular channel into time slots in order to increase the amount of data that can be carried. Thus, IS-136 TDMA allows a number of users to access a single RF channel without interference by allocating unique time slots to each user within each channel. In this example, PLMN 10 is described as conforming to the Global System for Mobile Communications (GSM) standard utilizing TDMA. It should be understood, however, that the principles disclosed may have application to other wireless networking systems such as those based on CDMA, Wideband CDMA (WCDMA), Enhanced Data for GSM Evolution (EDGE), and other wireless standards known to those of ordinary skill in the art.

The service area 30 of the network 10 is shown to include Location Areas 32 and 34 (LA1 and LA2, respectively). LA1 32 and LA2 34 are, in turn, divided into a plurality of cells (C1 . . . C5, and C1 . . . C4, respectively) which are shown as hexagonal shaped geographical areas of the service area 30. It should be understood, that more or less location areas and cells can be included in any given network configuration and that the configuration shown in FIG. 1 is provided as an example only. With prior wireless networks, the MS 28 could be paged by knowing that the MSC 16 was servicing known locations areas since the MSC 16 was associated with LA1 32 and LA2 34. With newer 3G networks, the paging process becomes more complicated. The present invention provides a means and method of paging a mobile station, such as MS 28, within either a 2G or 3G network utilizing a MSC pool.

Having described the primary elements of a wireless network and their function, we turn now to use of a wireless network, such as network 10, to page a mobile station, such as MS 28. Through the years, 2G networks have enjoyed widespread use and deployment. The current 3G network are the newest and most current generation of wireless network architectures which promise to offer many new services/features to the wireless subscriber. In contrast to a 2G network where location areas, such as LA1 and LA2, are roughly defined by specified geographic regions or boundaries served by one or more MSCs, with a 3G network the MSCs acts as one entity without any individual MSC being responsible for any individual BSC/RNC, location area, or cell. While the present invention is described in context of a mobile station, such as MS 28, operating in a 3G network it should be understood that the invention can be used in any network using a MSC pool such as, for example, a 2G network using a MSC pool.

Figure 2:
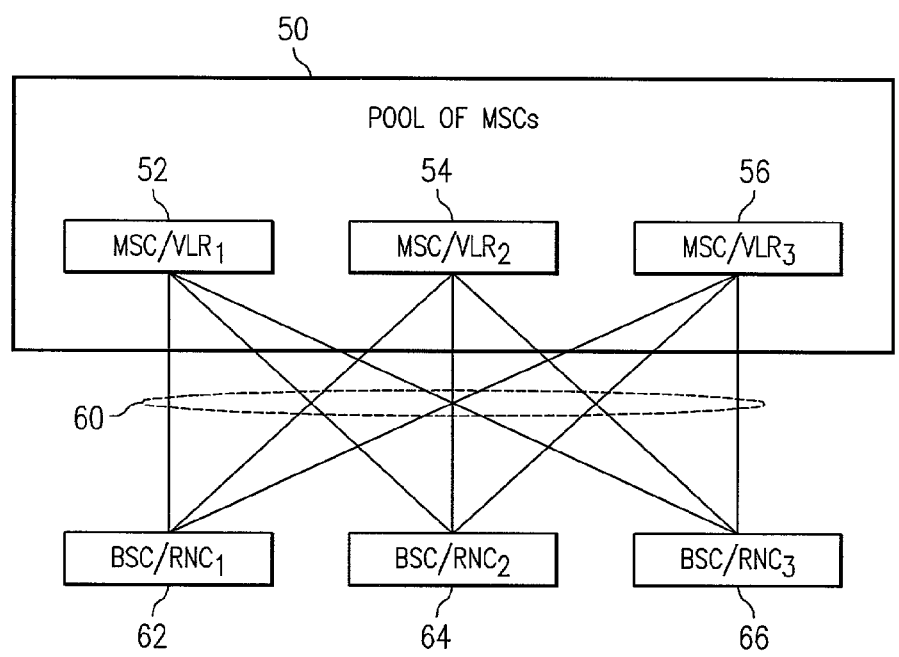
FIG. 2 is a block and system diagram illustrating the general arrangement of an MSC pool with respect to other components in a 3G wireless network.

To better understand the implementation of a MSC pool within a network, such as network 10, reference is made to FIG. 2 which is a block diagram of a network having a MSC pool 50 comprising MSC/VLR nodes 52, 54, 56 and BSC/RNC nodes 62, 64, 66. As shown, each MSC/VLR node 52, 54, 56 has the ability to communicate with each of the BSC/RNC nodes 62, 64, 66 through interface 60. Therefore, no MSC/VLR node in the pool 50 is dedicated to any individual BSC/RNC node.

The essence of MSC pool 50 is that the MSC/VLR (Visitor Location Register) nodes 62, 64, 66 can be added or removed from the pool 50, depending on the capacity needs of the network, without the other nodes being aware of the change. The MSC/VLR nodes 52, 54, 56 in the pool 50 act as one MSC/VLR and therefore do not control individually any one of BSCs/RNCs 62, 64, 66. Nor do the MSC/VLR nodes 52, 54, 56 control any specific location areas and cells within the service area of the network. This network configuration, however, creates a significant problem during paging of mobile station, such as MS 28.

Figure 3:
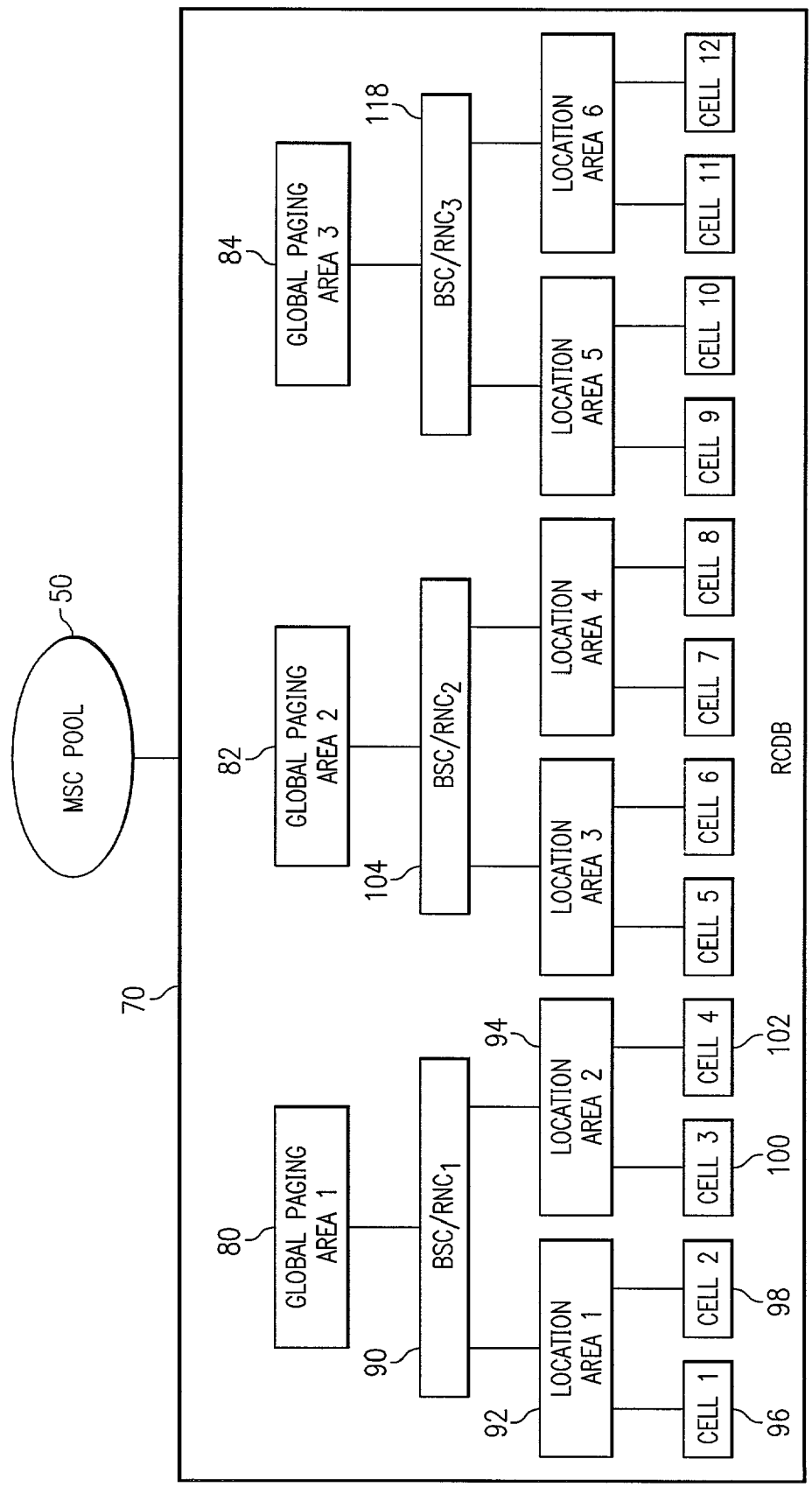
FIG. 3 illustrates the use of a radio configuration database to achieve global paging according to the system and methods of the present invention.

With reference to FIG. 3, the user of a radio configuration database (RCDB) 70 to overcome this paging problem according to the invention is shown. In particular, RCDB 70 is provided in order to overcome the difficulties associated with paging of a mobile station within a 3G network. To this end, the RCDB 70 is seen to include three (3) defined global paging areas 82, 84, 86, each paging area associated with a specified BSC/RNC 90,104,118, respectively. In this way, each BSC/RNC node in the coverage or service area of the network is associated with at least one global paging area. It should be understood that more or less global paging areas may be defined within the RCDB 70.

In turn each BSC/RNC node is associated with location areas served by the BSC/RNC. For example, BSC/RNC 90 has location areas 92, 94 which by design are also within global paging area 80. Each location area includes those cells that fall within the geographic boundaries of location areas defined by the network planner. Thus, location area 92 includes cells 96 and 98. It should be understood that more or less cells can be included in any one location area.

The tree-like structure of the RCDB 70 represents a geographical grouping of cells for the network service area that allows paging according to a global paging area. In contrast, in prior systems, paging users performed according to an individual location area or, if unsuccessful in a location area, over the entire service area of the network. Doing this, however, in a 3G network would be highly inefficient or impossible. Since the last known cell in which a subscriber is roaming is known by the network, paging of the subscriber can be performed in the previously located cell by selecting the appropriate location area to which that cell belongs. Moreover, since a subscriber is most likely to have roamed to an area covered by a location within the selected location area, paging is efficiently performed by focusing on those areas where the subscriber is most likely to be located. Therefore, the RCDB 70 provides an efficient and practical way of a paging a subscriber (through their mobile station, of course) within a network utilizing a MSC pool 50.

Figure 4:
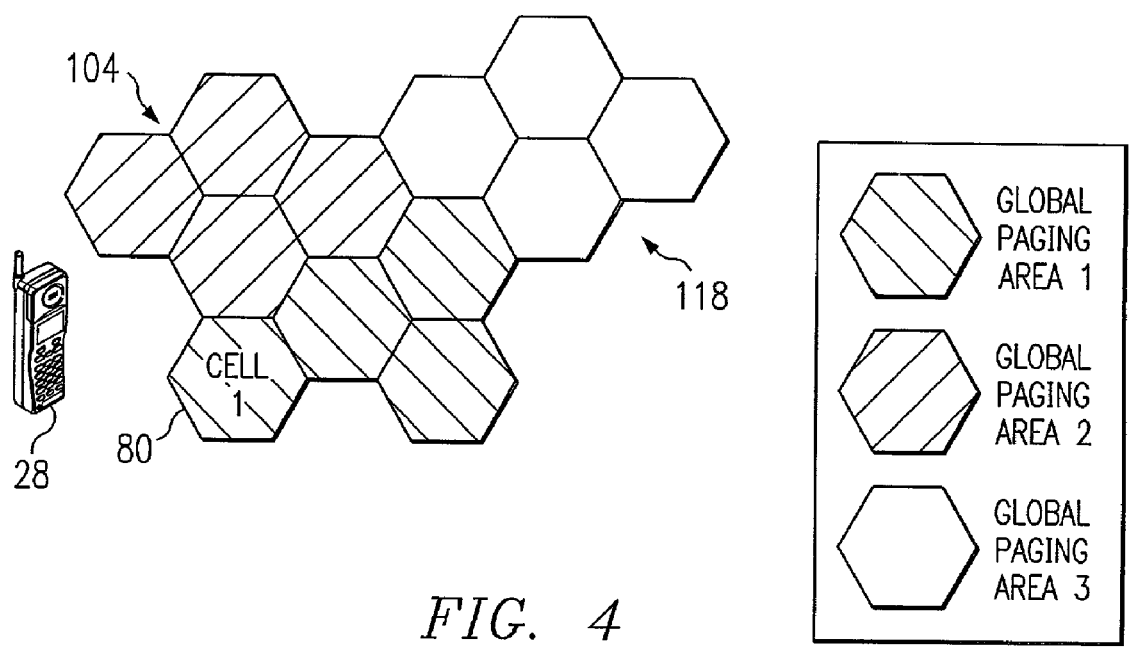
FIG. 4 illustrates a cluster of global paging area.

Referring to FIG. 4, therein is shown the global paging areas 80, 104, 118 of the RCDB 70 in plan form illustrating the arrangement of cells in each paging area 80, 104, 118. During paging, if the MS 28 roams into Cell 1, then the MSC in the pool 50 that handled the call towards MS 28 will try to page the MS 28 within location area 92 to which cell 1 belongs. If, however, no response is received from MS 28, the system will attempt to perform a global page of the MS 28 in all the location areas defined under the RCDB 70 for global paging area 80, namely location area 92 and location area 94, in this example. The RCDB 70, based on the information of the most recent location of the MS 28 (in this case, location area 92) will determine that location area 92 belongs to paging area 80 and will order paging for all location areas belonging to global paging area 80. The decision regarding which MSC area location area 92 belongs is therefore made based on the hierarchal structure of the RCDB 70.

Thus, paging is performed first in the proper location area and only when no response is received from the MS will paging will be done in the global paging area to which the location area belongs.

Figure 5:
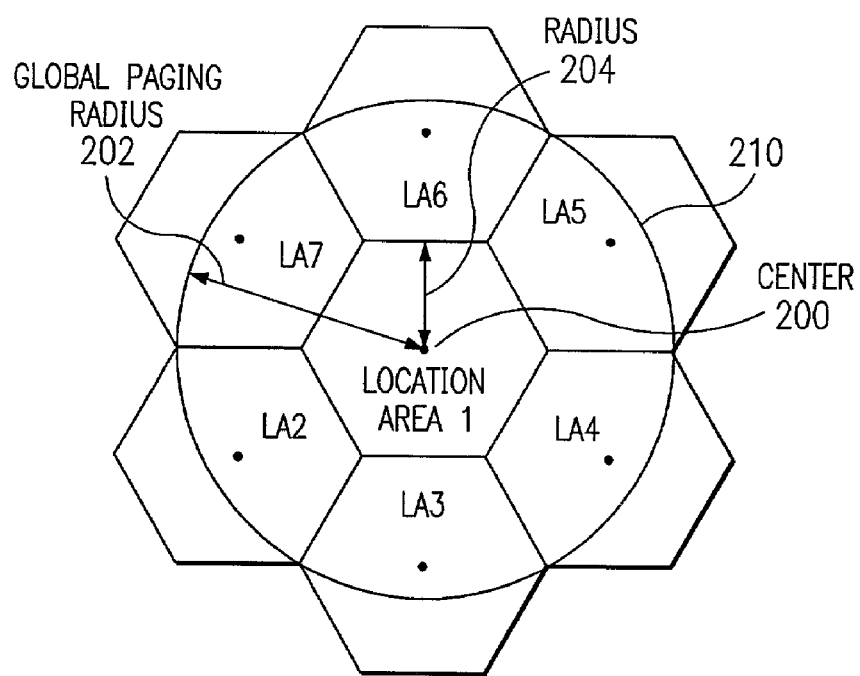
FIG. 5 illustrates the use of a circular paging area and use of paging radius.

The invention also proposes a method for dynamically defining the bounds of the global paging area according to the roaming activities of the subscriber. Referring to FIGS. 3 and 5, the RCDB 70 in this case has a similar structure but the global paging areas become dynamically defined by maintaining, for each location area, the coordinates of the center 200 and the radius 204 that defines the geographical area of the location area. The center and radius coordinates are stored in the RCDB 70 such that if the system decides that global paging should be performed for the MS 28, the coordinates of the center 200 and the radius 204 of the location area 92 are read.

Next, the system increases the radius to a new global paging radius 202 and checks which location area centers belong to the new circle 210. The MS 28 will be paged to all the location areas within the circle 210. Thus, if the initial global paging is unsuccessful, then the global paging radius 202 can be further increased and a new global paging can be ordered within the new circle 210.

The factor by which the initial radius 204 is increased can be predefined or it can be controlled by a dynamic process. The dynamic process is summarized in the next steps:

Step 1. The last "n" location areas where the MS 28 was roaming are stored in the subscriber record in the VLR. A time stamp is also kept for each location area. The time stamp indicates when the MS 28 entered into this location area.

Step 2. When the system performs global paging, it will check the stored location areas and time stamps. If this information indicates that the MS 28 is moving fast, i.e., small intervals between the different time stamps, the system will decide to use a bigger global paging radius 202. If, however, the location areas/time stamps indicate that the MS 28 is not moving or is moving slowly, then a smaller global paging radius will be ordered.

In FIG. 5 above, the centers of all neighboring location areas (LA2:LA7) belong to the circle 210 created by the global paging radius 202. Therefore, the system will request paging of the subscriber to all the neighboring location areas (LA2:LA7). An alternative to this idea is to define all the neighboring cell inside the RCDB 70 for each location area. In this case and if global paging is required, the system will find all the neighboring location areas and it will request paging to all of them. If this global paging is unsuccessful, then the system might go one step further and request global paging for all the neighboring location areas of the already paged ones.

This feature can work only if the latest location where the MS 28 was roaming is stored in the MSC/VLR. If this information does not exist, then the operator can decide to page the MS sequentially, i.e., first in global paging area 1, then in global paging area 2 and finally, if not found in the previous ones, global paging area 3. The operator can alternatively choose to perform global paging through the whole coverage area or not page the MS at all.

The latest subscriber location does not exist in the MSC/VLR if the subscriber was deregistered from the MSC/VLR and later when a call is received for this subscriber, the subscriber profile is downloaded from the HLR with the MAP operation "Restore Data." In order to reduce this possibility, the MSC/VLR should maintain the subscriber profile as long as possible and remove it only when there are serious problems like memory shortage or corrupted subscriber data, otherwise the subscriber record should be kept in the MSC/VLR.

Finally, in case of MSC/VLR failure, all the subscriber data is erased from the MSC/VLR. In this case and in order to avoid massive global paging, the network can suppress any global paging until a significant number of subscribers is re-registered in the MSC/VLR primarily using periodic update location. This can be achieved if a global paging suppression timer is set up to a value similar to the periodic location timer.

The embodiments shown and described above are only exemplary. Even though numerous characteristics and advantages of the present invention have been set forth in the foregoing description together with details of the invention, the disclosure is illustrative only and changes may be made within the principles of the invention to the full extent indicated by the broad general meaning of the terms used in the attached claims.

What is claimed is:

1. A wireless network providing global paging of a mobile station serviced by the wireless network comprising:
 a pool of mobile switching centers (MSC), for servicing mobile stations within a specified service area of said wireless network;
 means for paging a mobile station that is registered in a cell with the network
 a Home Location Register (HLR) for storing administrative information associated with the mobile station; and
 a radio configuration database (RCDB) comprising
  a plurality of defined global paging areas within said specified service area, each of the global paging areas having a hierarchical structure and being dynamically adjustable to include additional location areas according to a history of the movement of the mobile station, each of the plurality of global paging areas utilizing a separate base station controller/radio network controller (BSC/RNC) for each global paging area, wherein a global paging area comprises a predetermined set of location areas in which every MSC in the pool of MSCs can communicate and transmit paging requests to each BSC/RNC in each of the plurality of global paging areas and
 means for instructing the MSC that handled the registration of the mobile station to attempt to page the registered mobile station in the location area containing the cell and if the mobile station does not respond, paging the mobile station in the global paging area to which the cell belongs, and if still no response, paging the mobile station in other RCDB defined global paging areas prior to paging the mobile station in the entire service area.

2. The wireless network of claim 1 wherein said radio configuration database for defining a plurality of global paging areas further comprises
 means for geographically grouping the location areas in each global paging area.

3. The wireless network of claim 1, wherein said radio configuration database further includes:
 a first field for storing the cell identity of cells within said specified service area;
 a second field for storing the identity of location areas within said specified service area
 a third field for storing the identity of base station controllers or radio network controllers within said specified service area and
 a fourth field for identifying the global paging area.

4. The wireless network of claim 3 wherein any mobile switching center in said pool can page the mobile station within said specified service area by accessing said radio configuration database and determining the cell identity, the location area identity, the global paging area and base station controller/radio network controller identity of a mobile station roaming within said specified service area.

5. A method of paging a mobile station within a wireless network comprising a pool of mobile switching centers (MSC) for servicing mobile stations within a specified service area, the method comprising the steps of:
 storing administrative information associated with the mobile station in a Home Location Register (HLR)
 transmitting a paging request for a mobile station to the wireless network, wherein each MSC in the pool of MSCs can communicate and transmit paging requests with each Base Station Controller/Radio Network Controller (BSC/RNC) in the specified service area;
 paging the mobile station in a first cell in which the mobile station is registered wherein the first cell is associated with a location area in a global paging area within the specified service area, wherein the global paging area is defined in a radio configuration database (RCDB) as a hierarchical structure comprising a base station controller/radio network controller (BSC/RNC) for managing a plurality of associated location areas; and
 paging the mobile station in the global paging area to which the cell belongs if no answer is received in response to the first page; and
 dynamically adjusting the global paging area, by adjusting location areas, according to a history of the movement of the mobile station, prior to sending a page to the adjusted global paging area.

6. The method of claim 5 wherein the paging the mobile station in the global paging area step further comprises paging the mobile station in the adjusted global paging area after accessing the radio configuration database to obtain the most recent location information for the mobile station.

7. The method of claim 5 further comprising the steps of:
finding the cell in which the MS was most recently present;
determining the location area to which the cell belongs;
determining the global paging area to which said location area belongs;
paging the mobile station in the global paging area associated with said location area; and
paging the mobile station in another RCDB defined global paging area prior to paging the mobile station in the entire service area.

8. The method of claim 7 wherein said paging step is performed by paging the mobile station in all location areas within said global paging area.

9. The method of claim 5 wherein said global paging step further comprises the steps of:
accessing the radio configuration database to determine the identity of all cells, location areas, base station controllers/radio network controllers, and global paging areas of the specified service area of said wireless network and the last known location of the mobile station.

10. The method of claim 9 further comprising the step of transmitting a paging request in said last known global paging area.

* * * * *